United States Patent
Watanabe et al.

(10) Patent No.: US 11,215,757 B2
(45) Date of Patent: Jan. 4, 2022

(54) SPOT SIZE CONVERTER AND MANUFACTURING METHOD OF THE SAME

(71) Applicant: SUMITOMO ELECTRIC INDUSTRIES, LTD., Osaka (JP)

(72) Inventors: Masataka Watanabe, Osaka (JP); Hajime Tanaka, Osaka (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 0 days.

(21) Appl. No.: 16/929,831

(22) Filed: Jul. 15, 2020

(65) Prior Publication Data
US 2021/0018682 A1     Jan. 21, 2021

(30) Foreign Application Priority Data

Jul. 18, 2019   (JP) .............................. JP2019-132770

(51) Int. Cl.
*G02B 6/122* (2006.01)
*G02B 6/30* (2006.01)
(Continued)

(52) U.S. Cl.
CPC ....... *G02B 6/1228* (2013.01); *G02B 6/02033* (2013.01); *G02B 6/136* (2013.01); *G02B 6/305* (2013.01); *G02B 2006/12195* (2013.01)

(58) Field of Classification Search
CPC .. G02B 6/12002; G02B 6/122; G02B 6/1228; G02B 6/124; G02B 6/126; G02B 6/136; G02B 6/02033; G02B 6/305; G02B 6/34
(Continued)

(56) References Cited

U.S. PATENT DOCUMENTS

| | | | | |
|---|---|---|---|---|
| 6,037,189 A | * | 3/2000 | Goto | G02B 6/122 117/956 |
| 6,229,947 B1 | * | 5/2001 | Vawter | G02B 6/1228 385/131 |

(Continued)

FOREIGN PATENT DOCUMENTS

| | | |
|---|---|---|
| JP | 2002-519842 | 7/2002 |
| JP | 2015-084081 | 4/2015 |

(Continued)

OTHER PUBLICATIONS

Soares, F. M., et al, Extremely low-loss vertically-tapered spot size converter in InP-based waveguide structure, IEEE/LEOS Benelux Chapter, 2004.

*Primary Examiner* — Michael P Mooney
(74) *Attorney, Agent, or Firm* — Smith, Gambrell & Russell, LLP.

(57) ABSTRACT

A spot size converter includes a first waveguide including a first core layer, the first waveguide propagating light; and a second waveguide including a second core layer and provided on the first waveguide, the second waveguide propagating light. The first waveguide and the second waveguide extend in a waveguide direction. A first region and a second region are provided continuously along the waveguide direction. In the first region, the second waveguide has a tapered shape in a cross section which becomes narrower as going up away from the first waveguide. An angle between a side surface of the second waveguide and a bottom surface of the second waveguide is 60° or less.

11 Claims, 12 Drawing Sheets

(51) Int. Cl.
  *G02B 6/02*   (2006.01)
  *G02B 6/136*  (2006.01)
  *G02B 6/12*   (2006.01)
(58) Field of Classification Search
  USPC ........................................ 385/14, 43; 438/31
  See application file for complete search history.

(56) References Cited

U.S. PATENT DOCUMENTS

| 8,126,301 B2 * | 2/2012 | Ishizaka | G02B 6/13 |
| | | | 385/31 |
| 2002/0031297 A1 | 3/2002 | Forrest et al. | |
| 2015/0086153 A1 | 3/2015 | Ono et al. | |
| 2016/0025922 A1 | 1/2016 | Kono et al. | |

FOREIGN PATENT DOCUMENTS

| JP | 5773552 | 7/2015 |
| JP | 2016-024438 | 2/2016 |
| JP | 2016-200760 | 12/2016 |

* cited by examiner

A6

A7

B1, B2, B3

B4

SPOT SIZE CONVERTER AND MANUFACTURING METHOD OF THE SAME

CROSS-REFERENCE TO RELATED APPLICATION

This application is based upon and claims the benefit of priority of the prior Japanese Patent Application No. 2019-132770, filed on Jul. 18, 2019, the entire contents of which are incorporated herein by reference.

FIELD

The present invention relates to a spot size converter and method of manufacturing the same.

BACKGROUND

Japanese Patent Application Laid-Open No. 2002-519842 discloses a spot size converter for converting a spot size of light.

SUMMARY

The spot size converter has, for example, two waveguides through which light propagates. Thus, light is transited between the waveguides. However, a coupling between the waveguides is weak, and a conversion efficiency of the light may decrease. It is therefore an object of the present disclosure to provide a spot size converter and a method of manufacturing the same which can improve the conversion efficiency.

A spot size converter according to the present disclosure includes: a first waveguide including a first core layer, the first waveguide propagating light; and a second waveguide provided above the first waveguide and including a second core layer, the second waveguide propagating light. The first waveguide and the second waveguide extend in a waveguide direction. A first region and a second region are provided continuously along the waveguide direction. In the first region, the second waveguide has a tapered shape in a cross section which becomes narrower as going up away from the first waveguide. An angle between a side surface of the second waveguide and a bottom surface of the second waveguide is 60° or less.

A method of manufacturing a spot size converter according to the present disclosure includes steps of: forming a first waveguide and a second waveguide in this order; and etching the second waveguide to form a tapered shape in a cross section which becomes narrower as going away from the first waveguide. An angle between a side surface of the second waveguide and a bottom surface of the second waveguide is 60° or less.

DESCRIPTION OF EMBODIMENTS

Figure 1A:
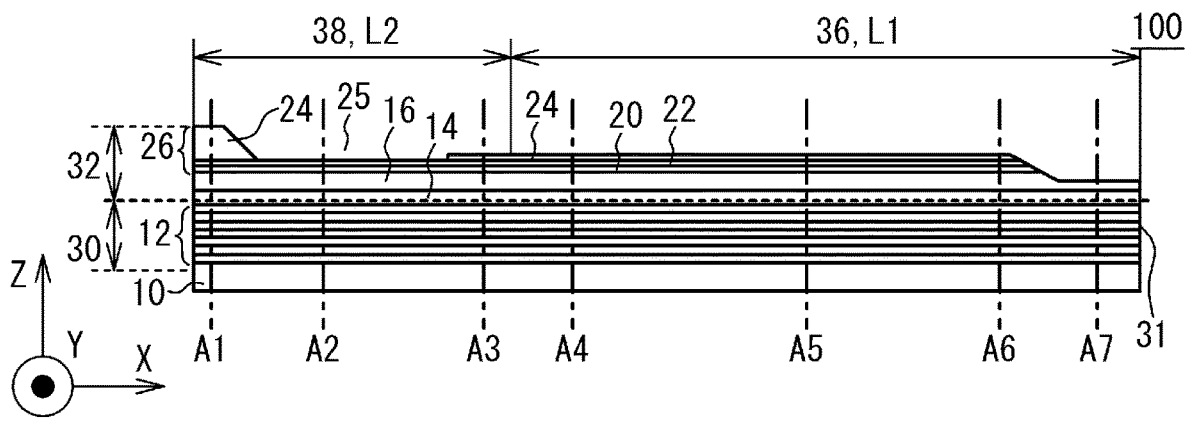
FIG. 1A is a cross-sectional view illustrating a spot size converter according to the first embodiment.

First, the contents of the embodiments of the present disclosure will be described by enumerating.

An embodiment of the present disclosure is (1) a spot size converter including: a first waveguide including a first core layer, the first waveguide propagating light; and a second waveguide including a second core layer and provided on the first waveguide, the second waveguide propagating light. The first waveguide and the second waveguide extend in a waveguide direction. A first region and a second region are continuously arranged along the waveguide direction. In the first region, the second waveguide has a tapered shape in a cross section which becomes narrower as going up away from the first waveguide. An angle between a side surface of the second waveguide and a bottom surface of the second waveguide is 60° or less. Thus a conversion efficiency of light between the first core layer and the second core layer is improved.

(2) The second waveguide may include a first cladding layer provided between the first core layer and the second core layer. The second core layer and the first cladding layer may be included in the tapered shape in the cross section. Compared to a case in which the first cladding layer is included in a rectangular portion of the second waveguide, an effective refractive index of the first cladding layer increases. Thus, the conversion efficiency is improved.

(3) The second waveguide may include a second cladding layer provided on the second core layer, and the second cladding layer in the first region may be thinner than the second cladding layer in the second region, or the second cladding layer may not be necessarily provided in the first region. Since an effective refractive index of the second cladding layer is reduced, the conversion efficiency is improved.

(4) The first waveguide may have a tapered portion in which a width of the first waveguide is reduced from the first region to the second region. The second waveguide may have a tapered portion in which a width of the second waveguide is reduced from the second region to the first region. The conversion efficiency of light between the waveguides is improved. Further, the light is cut off by the width of the first waveguide is reduced.

(5) The first region may have an input/output surface of light on a side opposite to the second region. A light input from the input/output surface can be transited from the first waveguide to the second waveguide with high conversion efficiency. Further, the light propagating through the second waveguide is transited to the first waveguide with high conversion efficiency, and it is possible to output the light with a high intensity from the input/output surface.

(6) An embodiment of the present disclosure is a method of manufacturing a spot size converter including steps of: forming a first waveguide having a first core layer and a second waveguide having a second core layer in this order; and etching the second waveguide to form a tapered shape in a cross section which becomes narrower as going up away from the first waveguide. An angle between a side surface of the second waveguide and a bottom surface of the second waveguide is 60 degrees or less. Thus, the conversion efficiency of light between the first waveguide and the second waveguide is improved.

(7) The second waveguide may include a cladding layer provided on the second core layer. The cladding layer may include an etching-stop layer. The step of etching the second waveguide may include steps of: wet-etching the cladding layer until the etching-stop layer is exposed for forming a mesa in the cladding layer, and dry-etching the mesa and the second core layer, the mesa including the cladding layer. By transferring a shape of the mesa including the cladding layer to the second core layer by dry-etching, a cross-sectional shape of the second core layer can be tapered.

(8) The mesa of the cladding layer may extend in <0-11> direction. By extending along the <0-11> direction, the mesa of the cladding layer is tapered after the wet-etching process. By transferring the shape of the mesa to the second core layer by dry-etching, the cross-sectional shape of the second core layer can be tapered.

Specific examples of a spot size converter and a manufacturing method thereof according to the present disclosure will be described below with reference to the drawings. It should be noted that the present invention is not limited to these examples, but is indicated by the claims, and it is intended to include all modifications within the meaning and range equivalent to the claims.

First Embodiment (spot size converter) FIG. 1A to FIG. 3B are cross-sectional views illustrating a spot size converter 100 according to the first embodiment. In the drawings, X-axis direction (waveguide direction) is a direction along which light propagates, Y-axis direction is a direction of widths of waveguides, and Z-axis direction is a direction along which semiconductor layers are stacked. Those axes are orthogonal to each other. The dotted line in each drawing is an imaginary line showing a boundary between a lower waveguide 30 (first waveguide) and an upper waveguide 32 (second waveguide). In order to avoid obscene drawings, hatching is omitted in the cross-sectional view.

As illustrated in FIG. 1A to FIG. 3B, the spot-size converter 100 has the lower waveguide 30 (first waveguide) and the upper waveguide 32 (second waveguide). The lower waveguide 30 and the upper waveguide 32 extend in the X-axis direction, are optically coupled to each other, and are stacked along the Z-axis direction.

The lower waveguide 30 includes a core layer 12 (first core layer). The upper waveguide 32 includes a core layer 16 (second core layer) and a cladding layer 26 (second cladding layer) stacked in order. The cladding layer 26 includes a cladding layer 20, an etching-stop layer 22, and a cladding layer 24 laminated in order on the core layer 16. A cladding layer 14 (first cladding layer) is provided between the core layer 12 and the core layer 16. A lower portion of the cladding layer 14 is included in the lower waveguide 30, and an upper portion of the cladding layer 14 is included in the upper waveguide 32. The core layer 16 is in contact with the cladding layers 14 and 20. The core layer 12 is in contact with the substrate 10 and the cladding layer 14. The core layer 12 and the core layer 16 are optically coupled to each other, and light transition occurs therebetween.

As illustrated in FIG. 1A, the spot size converter 100 has a transition region 36 (first region) and a connection portion 38 (second region) along the X-axis direction. The transition region 36 and the connection portion 38 are provided on a substrate 10, and are arranged continuously along the X-axis direction. A length L1 of the transition region 36 is, for example, 800 µm, and a length L2 of the connection portion 38 is, for example, 100 µm.

FIG. 1B to FIG. 3B illustrate cross-sections along lines A1-A7 of FIG. 1A. As illustrated in FIG. 1C and FIG. 2A, an upper portion of the core layer 12 is included in a mesa of the lower waveguide 30. As illustrated in FIG. 2B to FIG. 3B, in the transition region 36, all portion of the core layer 12 forms the mesa, and a portion of the substrate 10 is included in the mesa. In FIG. 2B, a portion of a side surface of the mesa from the substrate 10 to a lower part of the core layer 12 is inclined inwardly with respect to the Z-axis direction. From FIG. 2C to FIG. 3B, a side surface of the lower waveguide 30 extends in the Z-axis direction.

Figure 1B:
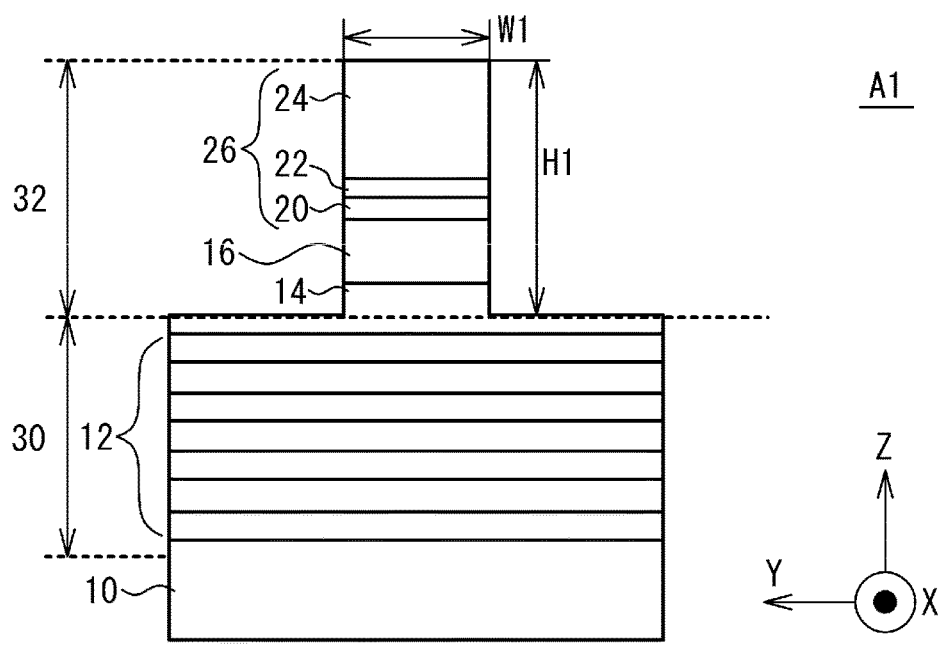
FIG. 1B is a cross-sectional view illustrating a spot size converter according to the first embodiment.
Figure 1C:
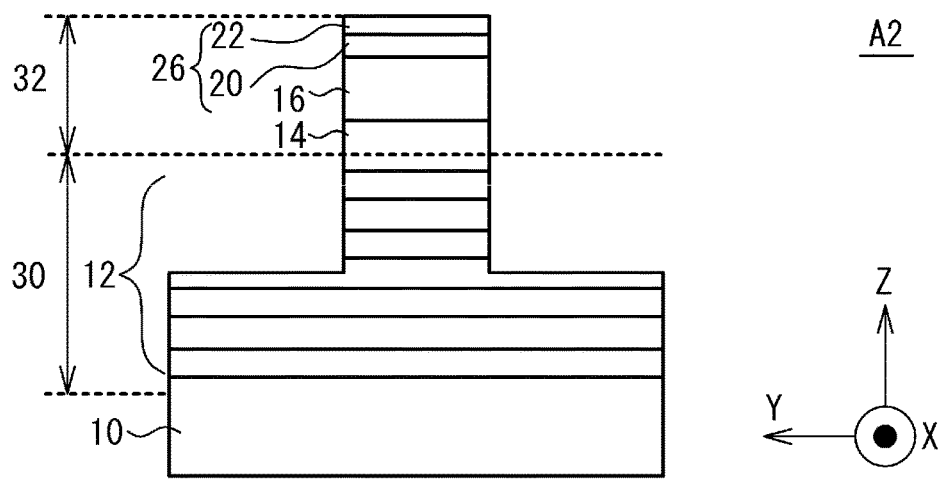
FIG. 1C is a cross-sectional view illustrating a spot size converter according to the first embodiment.

As illustrated in FIG. 1A and FIG. 1C, at a portion of the line A2, the cladding layer 24 of the cladding layer 26 is removed, an opening 25 is formed, and the etching-stop layer 22 is exposed. In the cross-sections in FIG. 2A to FIG. 3A, an upper side of the cladding layer 24 is partially removed, and the cladding layer 24 is narrower than that in the cross-section in FIG. 1B.

As illustrated in FIG. 1B to FIG. 3B, the upper waveguide 32 has a mesa. As illustrated in FIG. 1B, the upper waveguide 32 has a mesa having a rectangular cross-section. The upper waveguide 32 extends in the Z-axis direction. A width W1 of the mesa of the upper waveguide 32 is, for example, 1.5 µm, and a height H1 is, for example, 2.8 µm.

Figure 2A:
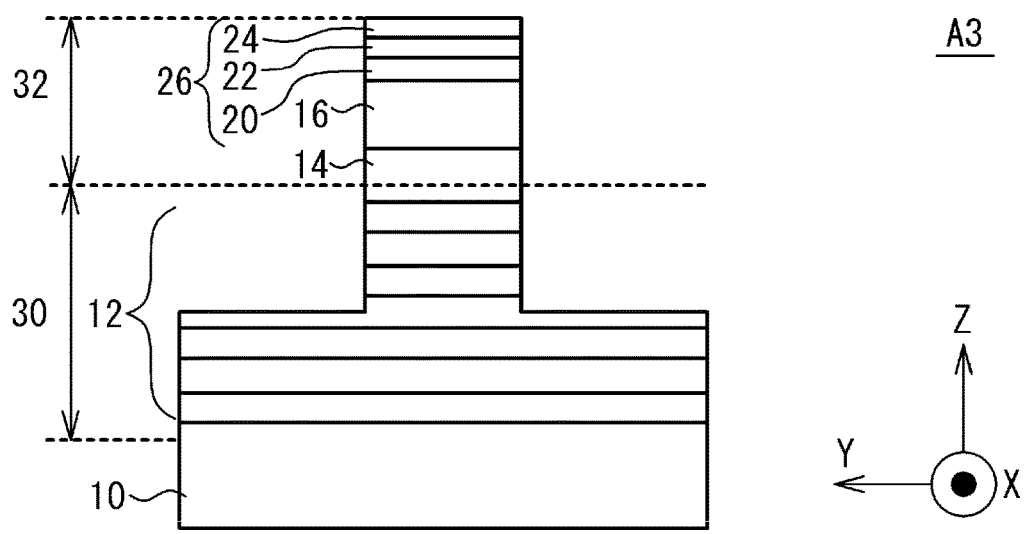
FIG. 2A is a cross-sectional view illustrating a spot size converter.
Figure 2B:
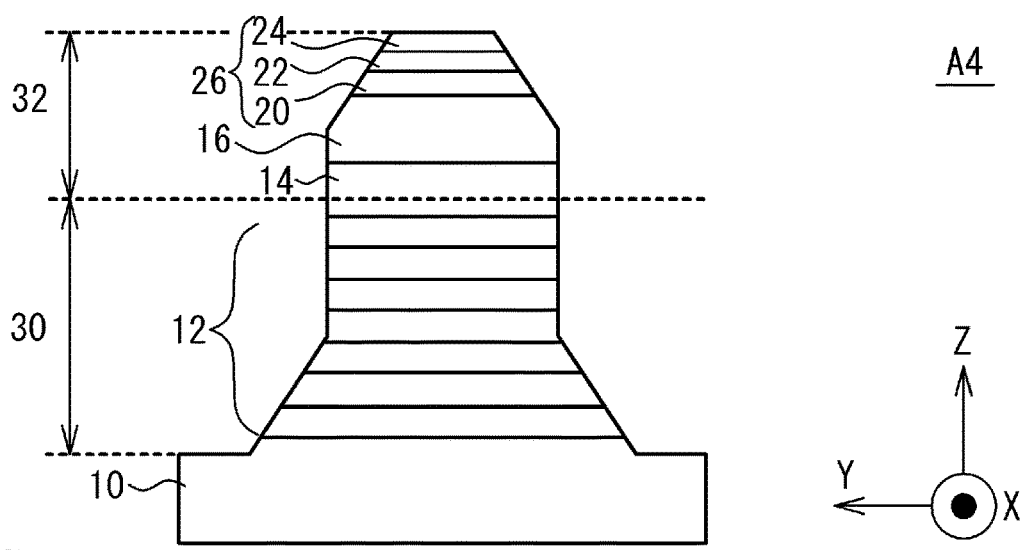
FIG. 2B is a cross-sectional view illustrating a spot size converter.
Figure 2C:
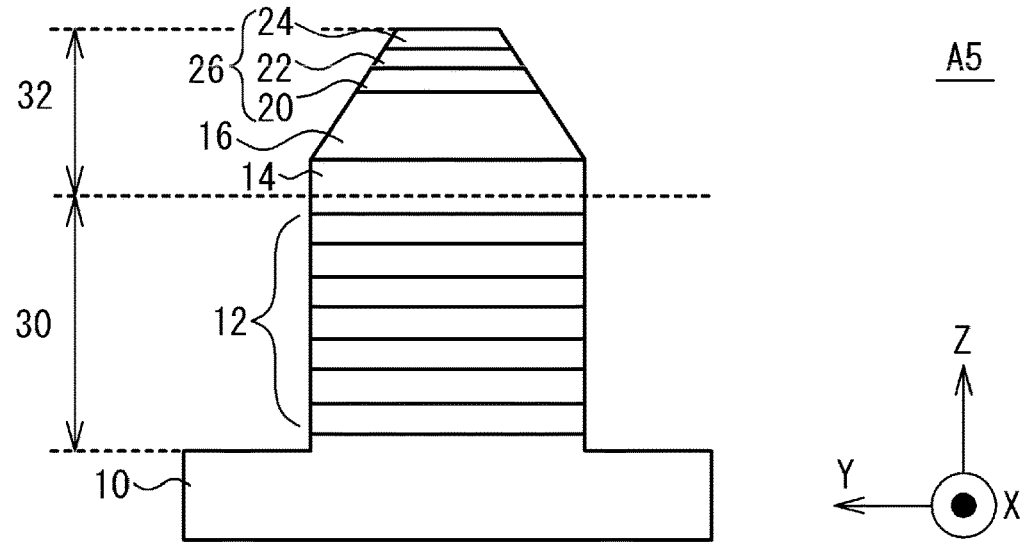
FIG. 2C is a cross-sectional view illustrating a spot size converter.

As illustrated in FIG. 2B to FIG. 3B, a cross-section in YZ plane of the upper waveguide 32 in the transition region 36 has a tapered shape whose width becomes narrower upwardly from the core layer 12. The cross section of the upper waveguide 32 in the transition region 36 is trapezoid or triangle. That is, the cladding layer 26, the core layer 16, and an upper side of the cladding layer 14 are tapered. In FIG. 2B and FIG. 2C, the upper waveguide 32 has a trapezoidal cross-sectional shape, and a side surface of the mesa from the core layer 16 to the cladding layer 26 is inclined inwardly.

Figure 3A:
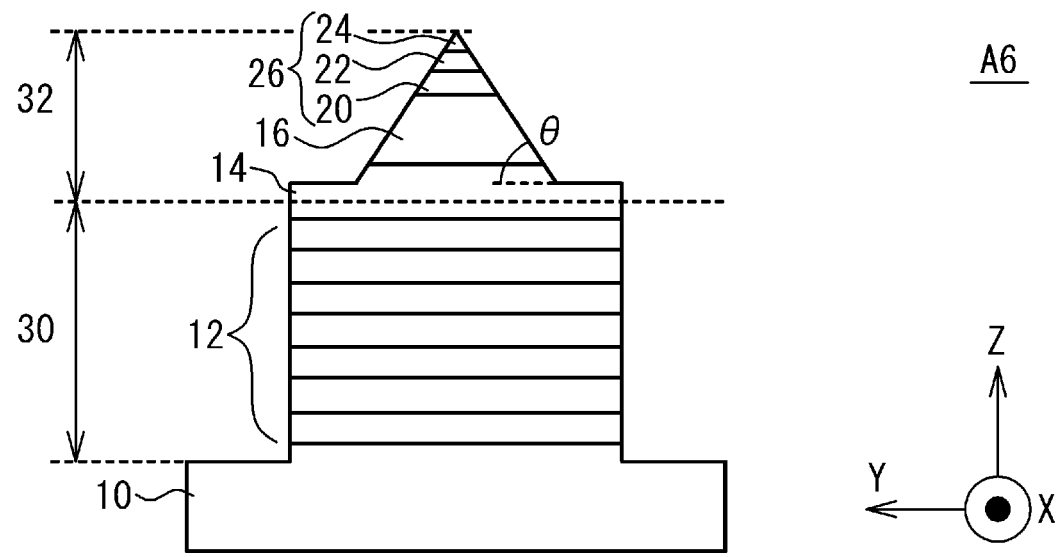
FIG. 3A is a cross-sectional view illustrating a spot-size converter.
Figure 3B:
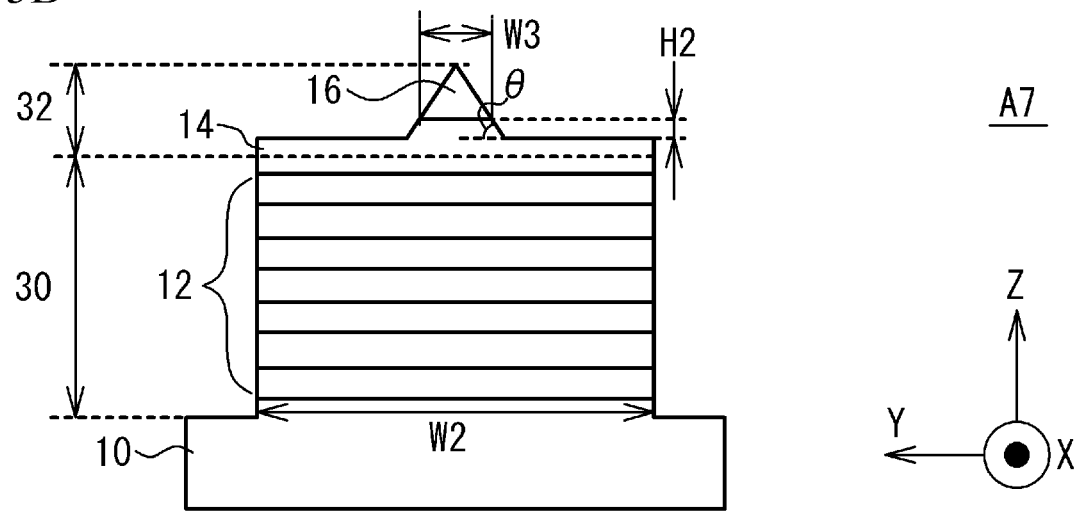
FIG. 3B is a cross-sectional view illustrating a spot size converter.

In FIG. 3A and FIG. 3B, the upper waveguide 32 has a triangular cross-sectional shape. That is, side surfaces of the cladding layer 14, the core layer 16, and the cladding layer 26 form a triangle in the cross section. In FIG. 3A, the cladding layer 24 includes apexes of the triangle. In FIG. 3B, the cladding layers 20, 24 and the etching-stop layer 22 are removed. Thus the core layer 16 is exposed. In FIG. 3B, the core layer 16 includes the apexes of the triangle. In the triangle included in the cross section of the upper waveguide 32, a bottom angle θ of the triangle is, for example, 54°, and may be 60° or less. The triangle is an isosceles triangle. The side surface of the upper waveguide 32 may be a straight slope, or may be a curved surface with convex upward or convex downward. When the side surface has the straight slope, the bottom angle θ is defined as an angle formed by a bottom surface and the side surface of the upper waveguide 32. When the side surface is curved, the bottom angle θ is an angle at which the bottom surface intersecting with an imaginary line connecting a top apex and a bottom apex of the triangle in the cross section. A width W2 of the mesa portion of the lower waveguide 30 illustrated in FIG. 3B is, for example, 3.5 μm. A width W3 of the core layer 16 of the upper waveguide 32 is smaller than the width W2, and is, for example, 0.8 μm. A height H2 from a bottom surface of the core layer 16 to an exposed surface of the cladding layer 14 is, for example, 0.1 μm.

From the connection portion 38 to the transition region 36 (from the cross sections of FIG. 1C to FIG. 3B), the width of the upper waveguide 32 is reduced. From the transition region 36 to the connection portion 38 (from the cross sections of FIG. 3B to FIG. 1C), a width of a closer portion to the upper waveguide 32 of the lower waveguide 30 is reduced.

The substrate 10 includes, for example, a compound semiconductor wafer formed of indium phosphide (InP) doped with iron (Fe), and a buffer layer formed of undoped InP. A thickness of the substrate 10 is, for example, 600 μm. The core layer 12 includes, for example, a plurality of InP layers and indium gallium arsenide phosphorus (InGaAsP) layers which are alternately stacked. By laminating the InP layer having a low refractive index and the InGaAsP layer having a high refractive index, a refractive index of the core layer 12 is adjusted. The refractive index of the core layer 12 is an average refractive index determined by thicknesses and refractive indices of the InGaAsP layers and thicknesses of the InP layers. The refractive index of the InGaAsP layer is adjusted by a composition (i.e., bandgap wavelength). The thickness of the InGaAsP layer is, for example, 50 nm to 200 nm. The thickness of the InP layer included in the core layer 12 is, for example, 100 nm to 800 nm. The number of layers is, for example, 6 layers to 10 layers.

The cladding layer 14 is formed of n-type InP doped with silicon (Si), and the thickness is 500 nm, for example. The core layer 16 has a multiple-quantum-well (MQW) structure obtained by laminating, for example, aluminum indium arsenide (AlInAs) layers and aluminum gallium indium arsenide (AlGaInAs) layers. The core layer 16 also functions as an active layer in an optical modulator (not illustrated) monolithically integrated to the spot size converter 100. A thickness of the core layer 16 is, for example, 500 nm. A refractive index of the core layer 16 is higher than that of the InGaAsP layer. The cladding layer 20 is formed of non-doped InP, for example, and has a thickness of 200 nm. The etching-stop layer 22 is formed of, for example, zinc (Zn)-doped InGaAsP, and has a thickness of 10 nm to 20 nm. The cladding layer 24 is formed of, for example, Zn-doped p-type InP, and has a thickness of 1000 nm. An insulating film and a resin or the like may be provided on the upper waveguide 32, and the upper waveguide 32 is not exposed to air.

The connection portion 38 is, for example, a portion connected to the optical modulator (not illustrated). In FIG. 1A, an end face 31 of the +X side of the transition region 36 is an input/output surface where light is incident or emitted. A wavelength of the light is, for example, 1.55 μm. The light incident from the end face 31 propagates through the lower waveguide 30, transitions from the core layer 12 of the lower waveguide 30 to the core layer 16 of the upper waveguide 32 in the transition region 36, propagates through the core layer 16, and then goes into the optical modulator. In FIG. 1A, the optical modulator (not illustrated) is connected to the −X side of the connection portion 38. Light propagating from the optical modulator propagates through the connection portion 38 toward the transition region 36, transits from the core layer 16 of the upper waveguide 32 to the core layer 12 of the lower waveguide 30, and is emitted from the end face 31.

The refractive indices of the cladding layers 14 and 26 are lower than the refractive indices of the core layers 12 and 16. Thus, the light can be confined in the core layers 12 and 16. The refractive index of the core layer 12 is lower than the refractive index of the core layer 16. The refractive indices are adjusted so that the light transits between the core layers 12 and 16. For example, in the transition region 36, an effective refractive index of the lower waveguide 30 and an effective refractive index of the upper waveguide 32 are made comparable, preferably equal. In order to reduce the effective refractive index of the upper waveguide 32, the upper waveguide 32 may be made thinner and narrower than the lower waveguide 30. However, when the cladding layer 14 is made narrower as with the core layer 16, an effective refractive index at the cladding layer 14 is excessively lowered. Thus, there is a possibility that the conversion efficiency of the light between the core layers is reduced. Further, a mechanical strength of the upper waveguide 32 is reduced by narrowing the upper waveguide 32, resulting a possibility of breakage.

In the first embodiment, the cross-sectional shape of the upper waveguide 32 is tapered upward, and the cladding layer 14 has a wider bottom surface than a rectangular cross section of the same effective refractive index. Therefore the effective refractive index of the cladding layer 14 is kept equivalent to those of the lower waveguide 30 and the upper waveguide 32, and the conversion efficiency between the core layers is improved. Further, the mechanical strength is also increased as compared with the case of rectangular cross section.

Figure 4:
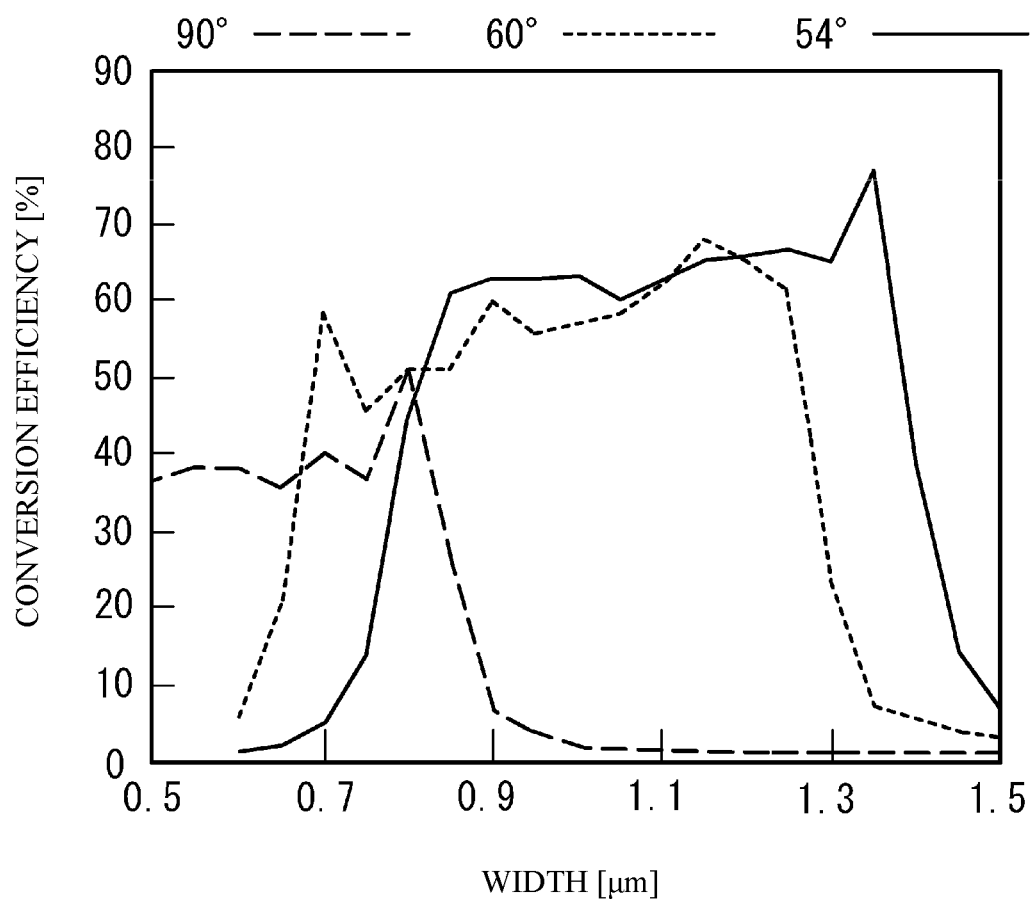
FIG. 4 is a diagram showing a calculation result of a conversion efficiency.

FIG. 4 is a diagram showing a calculation result of the conversion efficiency. Horizontal axis represents the width W3 of a base of the triangle of the core layer 16 at the end face 31. A structure of the end face 31 is the same as the cross section along the line A7 in FIG. 1A. Vertical axis of FIG. 4 represents the conversion efficiency of the light between the core layers when the light incident on the lower waveguide 30 is transferred to the upper waveguide 32. The broken line is an example of the bottom angle θ of the upper waveguide 32 is 90°, i.e., the upper waveguide 32 is rectangular. The dotted line and the solid line correspond to the upper waveguide 32 having tapered shapes. The dotted line is an example of the bottom angle θ is 60°, and the solid line is an example of the bottom angle θ is 54°. In the calculation, the length L1 of the transition region 36 is set to 800 μm, and the width of the lower waveguide 30 is set to 3.5 μm. The width of the bottom surface of the upper waveguide 32 in the transition region 36 increases 0.32 μm on one side (+Y side, −Y side each) as it moves away from the end face 31.

In the example where θ is 90°, the conversion efficiency is about 40% at a width of 0.5 μm to 0.7 μm, and the conversion efficiency decreases sharply when the width becomes 0.8 μm or more. In the example of θ is 60° and the example of 54°, a high conversion efficiency of about 60% is kept in a range of the width 0.8 μm or more. That is, when the upper waveguide 32 is tapered and the effective refractive index of the cladding layer 14 is kept equivalent to the waveguides, the conversion efficiency is improved as the width of the bottom being increased.

(Manufacturing Method) FIG. 5A, and FIG. 6A to FIG. 11A are cross-sectional views illustrating methods of manufacturing the spot size converter 100. FIG. 5B, FIG. 5C, FIG. 11B, and FIG. 11C are plan views illustrating methods of manufacturing the spot size converter 100.

Figure 5A:
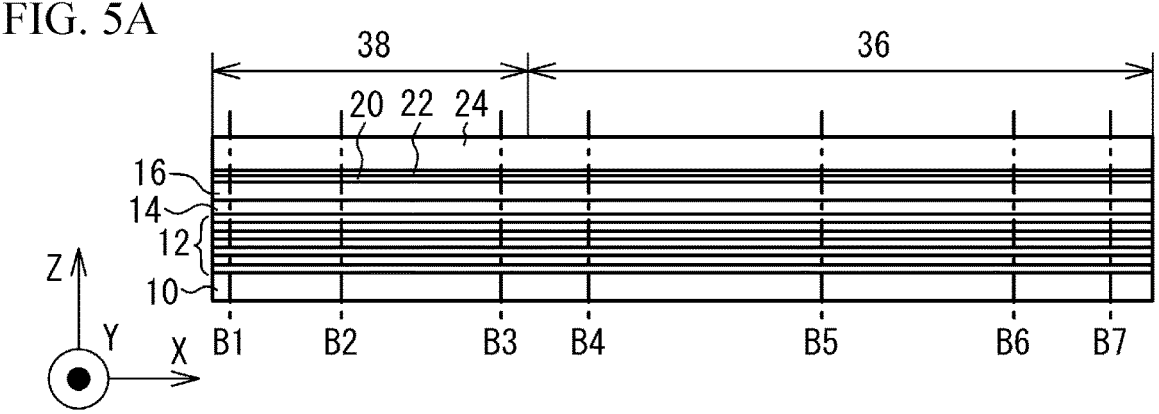
FIG. 5A is a cross-sectional view illustrating a method of manufacturing a spot size converter.
Figure 5B:
FIG. 5B is a plan view illustrating a method of manufacturing a spot size converter.

As illustrated in FIG. 5A and FIG. 5B, the core layer 12, the cladding layer 14, the core layer 16, the cladding layer 20, the etching-stop layer 22, and the cladding layer 24 are epitaxially grown in this order on the substrate 10 by, for example, metal-organic chemical vapor deposition (MOCVD). Further, a contact layer (not illustrated) is grown. The contact layer is removed from a portion to be the spot size converter, and remains in the portion to be the optical modulator.

Figure 5C:
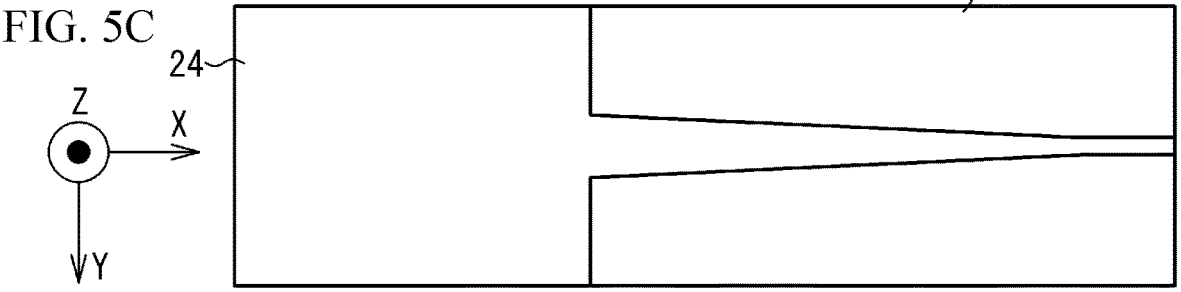
FIG. 5C is a plan view illustrating a method of manufacturing a spot size converter.

As illustrated in FIG. 5C, the cladding layer 24 is etched. An insulating film, for example, a silicon nitride (SiN) film having a thickness of 400 nm is formed on the cladding layer 24. A resist mask is formed on the insulating film by photolithography. Reactive ion etching (RIE) using carbon tetrafluoride ($CF_4$) gas or the like is performed to transfer a pattern of the resist mask to the insulating film. The resist mask is removed by oxygen ($O_2$) ashing. The cladding layer 24 is etched by wet-etching using hydrochloric acid. The wet-etching stops at the etching-stop layer 22. The insulating film is peeled off using buffered hydrofluoric acid (BHF) or the like. As illustrated in FIG. 5C, the cladding layer 24 has a tapered portion in the plan view with an increasing width from the +X side toward the −X side. After the wet-etching step, a side view seen from the Y-axis direction is the same as FIG. 5A.

Figure 6A:
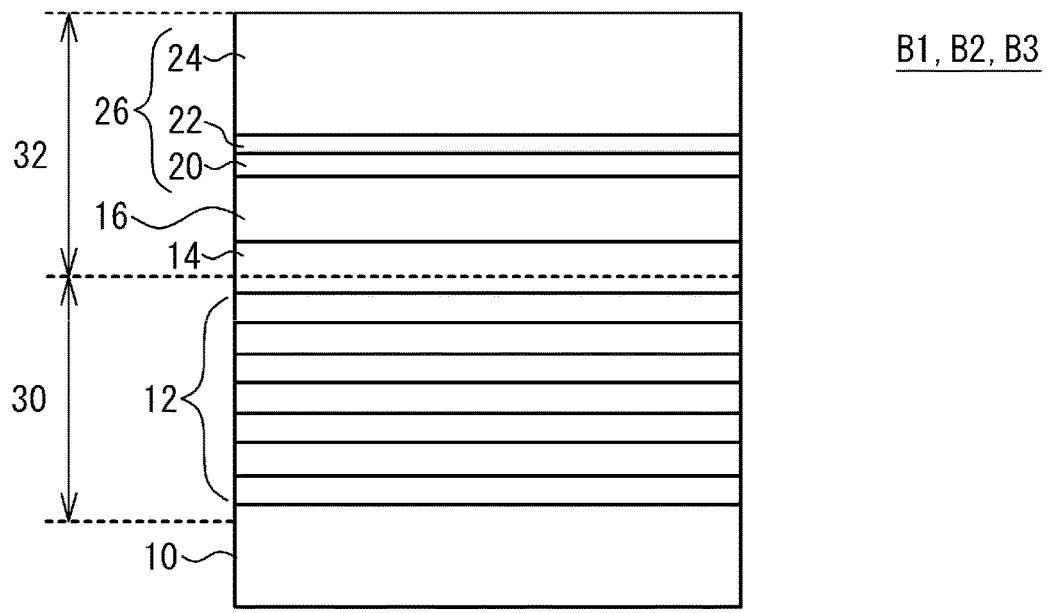
FIG. 6A is a cross-sectional view illustrating a method of manufacturing a spot size converter.
Figure 6B:
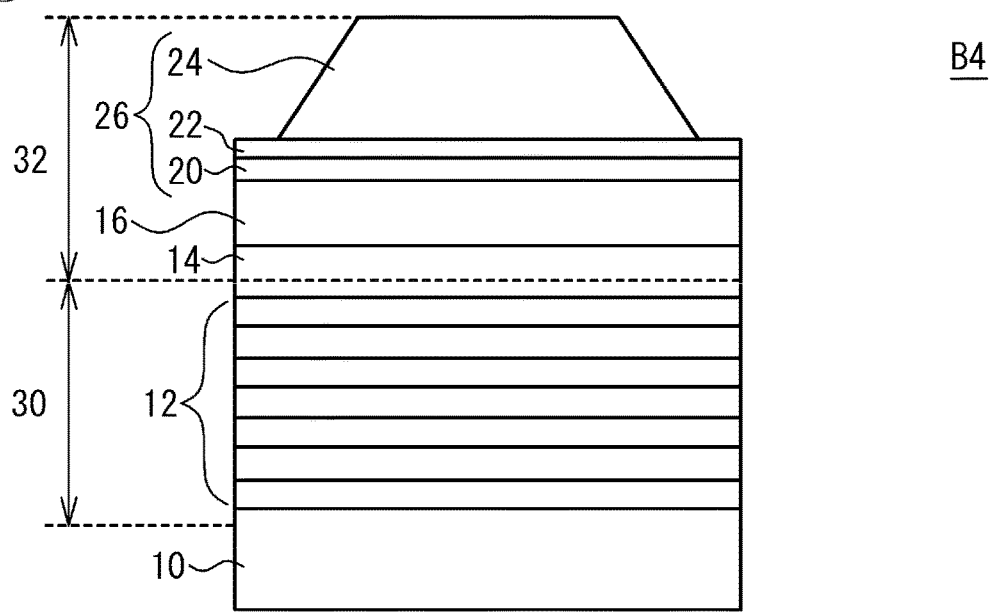
FIG. 6B is a cross-sectional view illustrating a method of manufacturing a spot size converter.
Figure 7A:
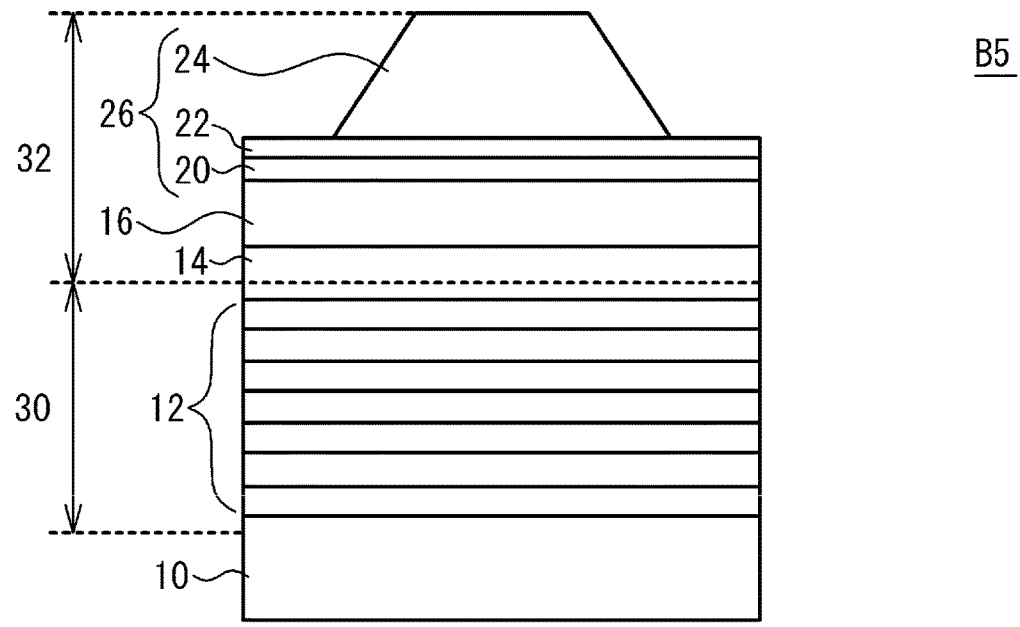
FIG. 7A is a cross-sectional view illustrating a method of manufacturing a spot size converter.
Figure 7B:
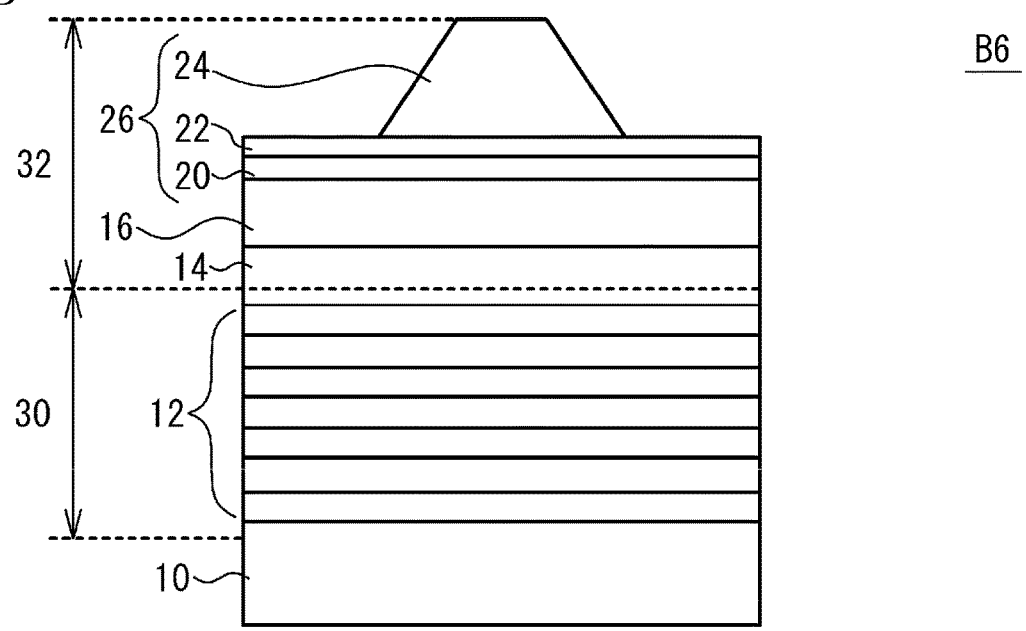
FIG. 7B is a cross-sectional view illustrating a method of manufacturing a spot size converter.
Figure 8:
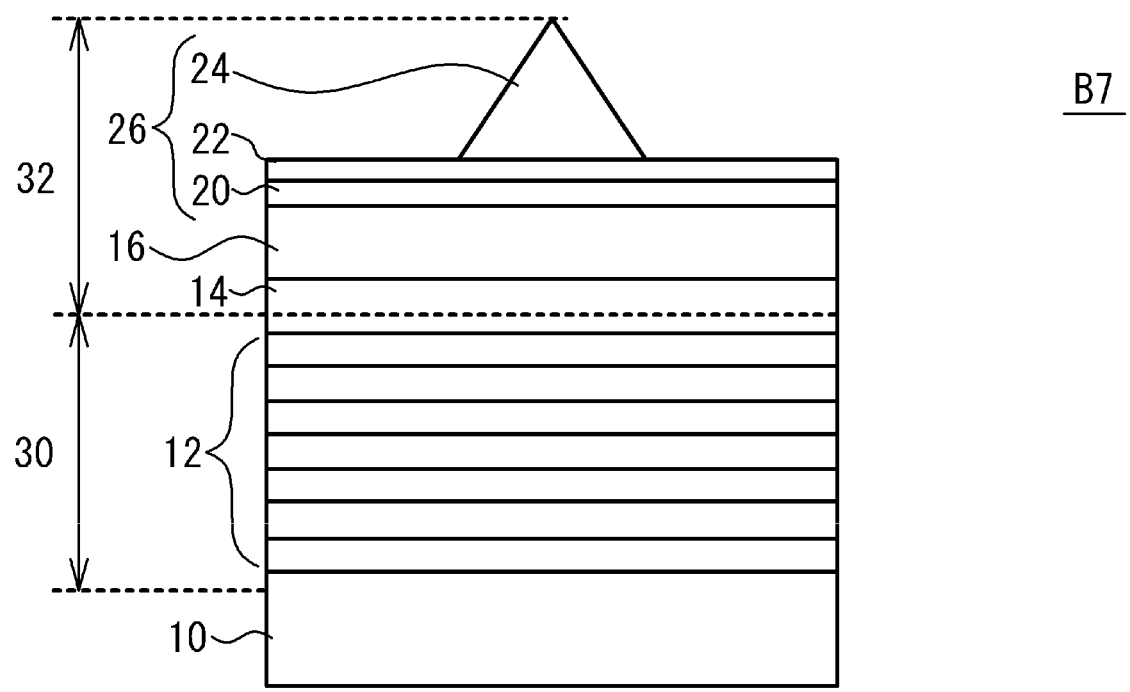
FIG. 8 is a cross-sectional view illustrating a method of manufacturing a spot size converter.

Lines B1 to B7 of FIG. 5A are located at the same locations as the lines A1 to A7 of FIG. 1A. FIG. 6A illustrates a cross section along the lines B1 to B3 after the wet-etching step, FIG. 6B illustrates a cross section along the line B4, FIG. 7A illustrates a cross section along the line B5, FIG. 7B illustrates a cross section along the line B6, and FIG. 8 illustrates a cross section along the line B7, respectively. As illustrated in FIG. 6B to FIG. 8, the cross-sectional shape of the upper waveguide 32 becomes tapered by the wet-etching. In addition, as illustrated in FIG. 5C, the mesa of the upper waveguide 32 extends in the <0-11> direction. The cross-sectional shape is trapezoidal in FIG. 6B to FIG. 7B, and triangular as in FIG. 8. Specifically, the cladding layer 24 of the upper waveguide 32 has a tapered shape in the cross sections.

Figure 9A:
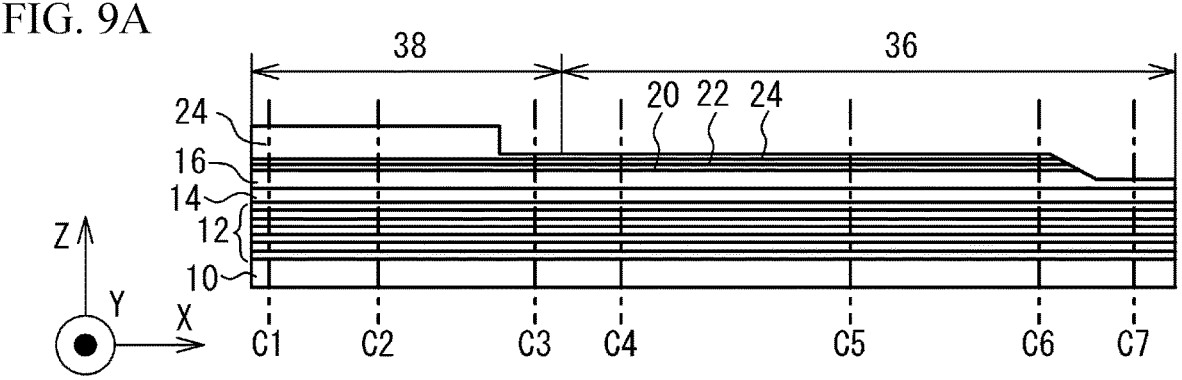
FIG. 9A is a cross-sectional view illustrating a method of manufacturing a spot size converter.

As illustrated in FIG. 9A, after the wet-etching, the cladding layer 24, the etching-stop layer 22, the cladding layer 20, the core layer 16, and the cladding layer 14 are etched by using a dry-etching method so as to transfer the tapered shape of the cladding layer 24 to these layers. Specifically, an insulating film such as a SiN film having a thickness of 400 nm is formed on the cladding layer 24, and a SiN mask is formed from the SiN film by photolithography of a resist. The SiN film is etched by $CF_4$ gas, and the resist is removed by $O_2$ ashing. The dry-etching of the cladding layer 24 through the cladding layer 14 is performed by RIE using a gas containing hydrogen iodide (HI) and silicon tetrachloride ($SiCl_4$). The SiN mask is removed by BHF.

Figure 9B:
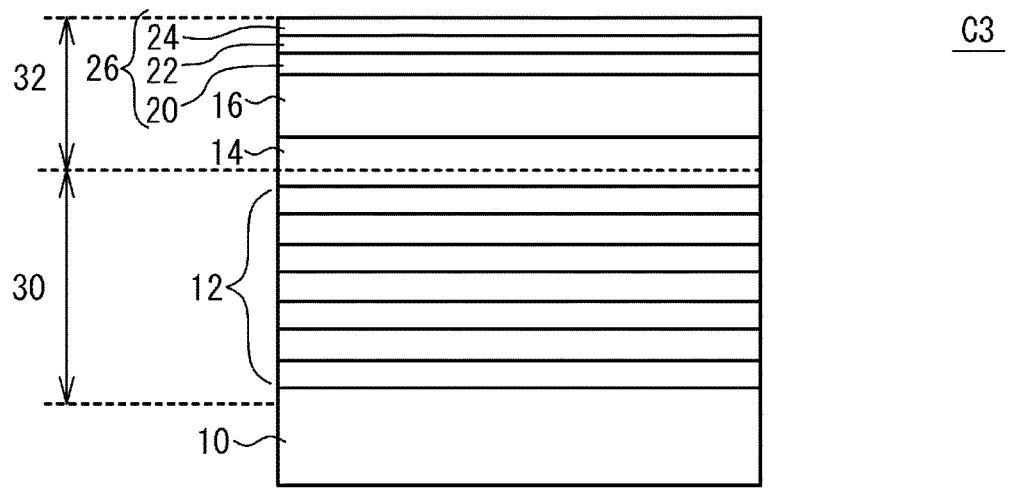
FIG. 9B is a cross-sectional view illustrating a method of manufacturing a spot size converter.
Figure 9C:
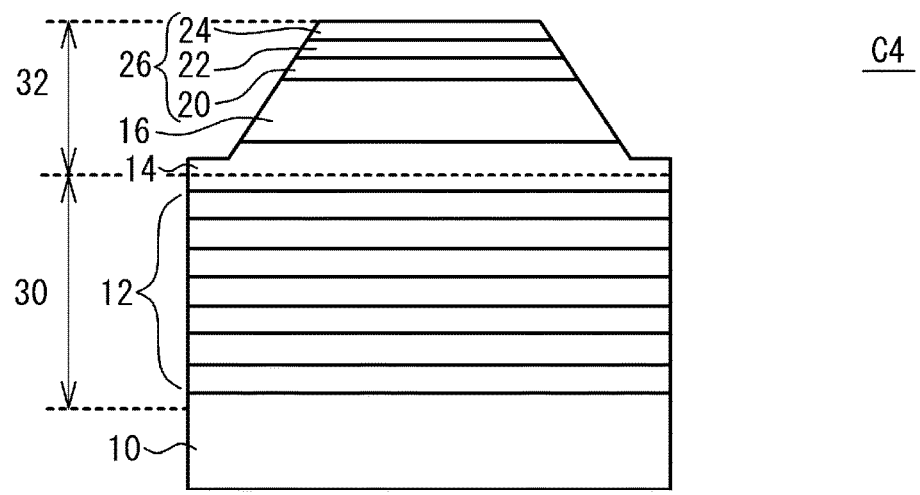
FIG. 9C is a cross-sectional view illustrating a method of manufacturing a spot size converter.
Figure 10A:
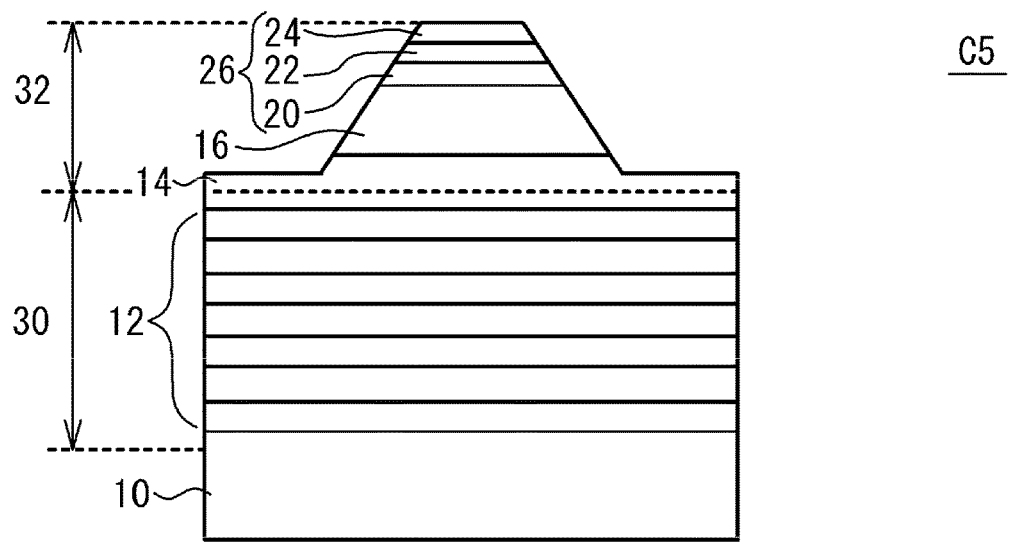
FIG. 10A is a cross-sectional view illustrating a method of manufacturing a spot size converter.
Figure 10B:
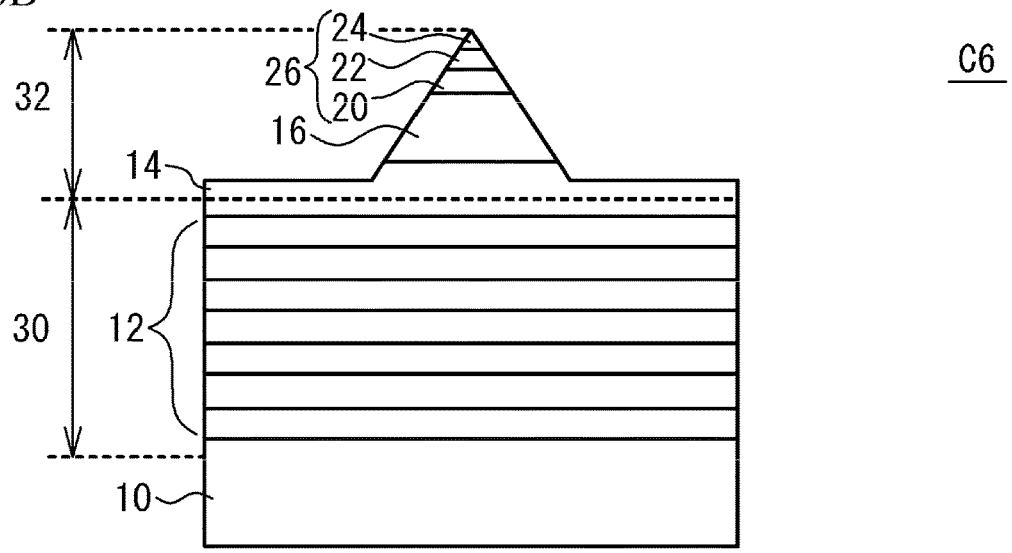
FIG. 10B is a cross-sectional view illustrating a method of manufacturing a spot size converter.
Figure 10C:
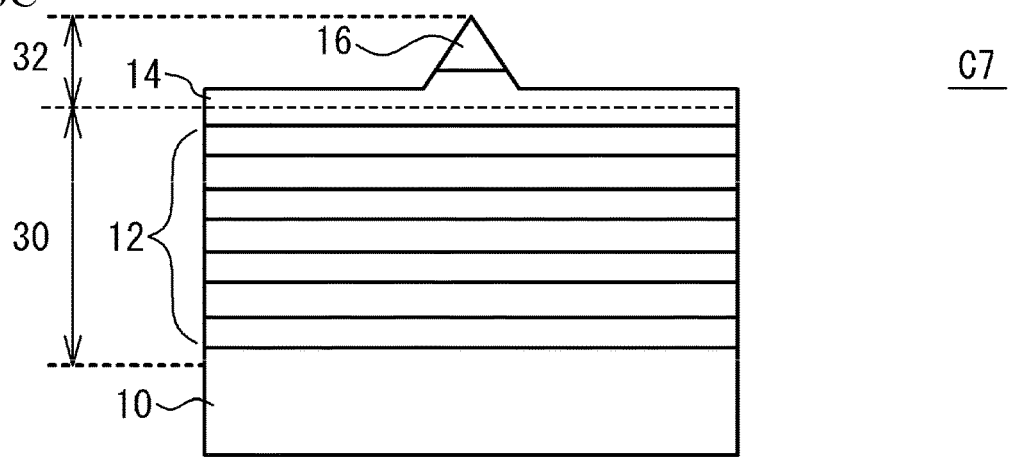
FIG. 10C is a cross-sectional view illustrating a method of manufacturing a spot size converter.

Lines C1-C7 of FIG. 9A are located in the same locations as the lines A1-A7 of FIG. 1A. Cross-sections along the lines C1 and C2 are the same as FIG. 6A. FIG. 9B illustrates a cross section along the line C3, FIG. 9C illustrates a cross section along the line C4, FIG. 10A illustrates a cross section along the line C5, FIG. 10B illustrates a cross section along the line C6, and FIG. 10C illustrates a cross section along the line C7. From FIG. 9B to FIG. 10B, the cladding layer 24 is thinned by the dry-etching, and in FIG. 10C, the cladding layer 24 is removed.

As illustrated in FIG. 9C through FIG. 10C, the cladding layer 14, the core layer 16, and the cladding layer 26 have a tapered shape in the cross section. In FIG. 9C and FIG. 10A, a cross-sectional shape includes trapezoid. The cross-sectional shape in FIG. 10B and FIG. 10C includes triangle. The widths of these layers (the widths of the mesa) decrease from FIG. 9C to FIG. 10C (from the −X side to the +X side).

Figure 11A:
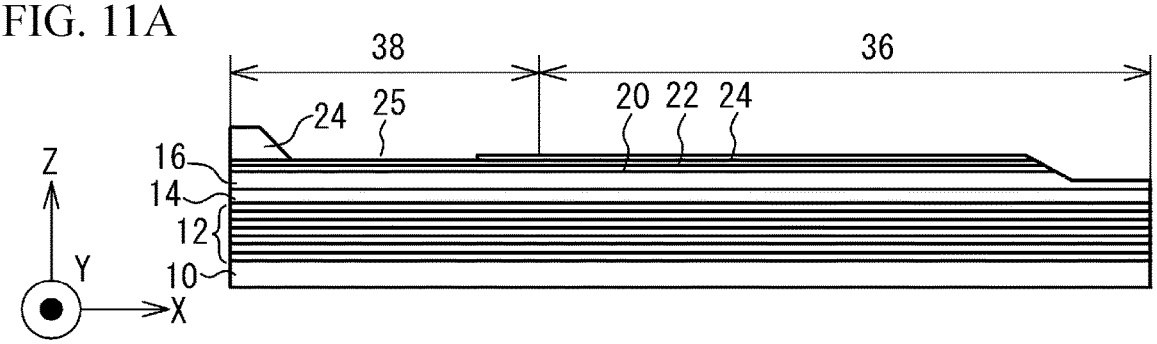
FIG. 11A is a cross-sectional view illustrating a method of manufacturing a spot size converter.
Figure 11B:
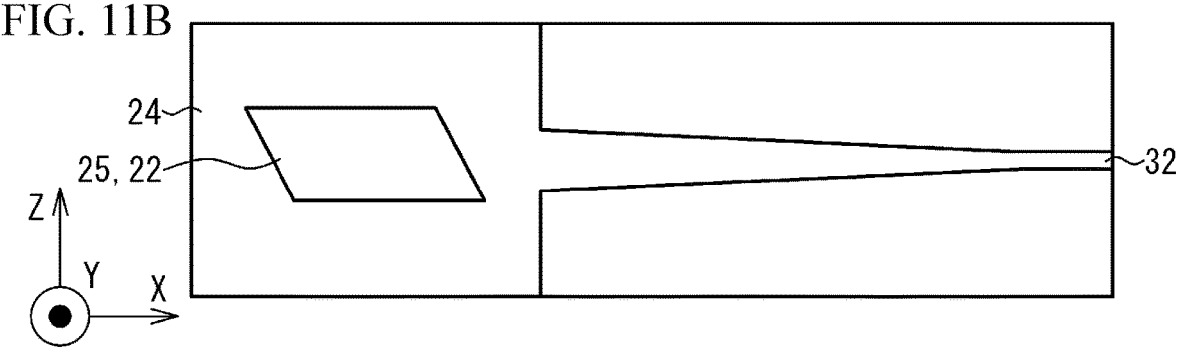
FIG. 11B is a plan view illustrating a method of manufacturing a spot size converter.

As illustrated in FIG. 11A and FIG. 11B, a part of the cladding layer 24 is removed by wet-etching to form the opening 25. Specifically, an insulating film such as a SiN film having a thickness of 400 nm is formed on the upper waveguide 32, and a resist pattern is formed on the SiN film by photolithography. The SiN film is etched by RIE using $CF_4$ gas, or the like, and the resist pattern is transferred to the SiN film. The resist pattern is removed by $O_2$ ashing. The cladding layer 24 is wet-etched with an etchant containing hydrochloric acid by using the SiN mask. As illustrated in FIG. 11B, a shape of the opening 25 in the XY plane is, for example, a parallelogram. As illustrated in FIG. 11A, a wall surface of the cladding layer 24 is inclined from the Z axis, and the etching-stop layer 22 is exposed from the opening 25. The SiN mask is peeled off by BHF.

Figure 11C:
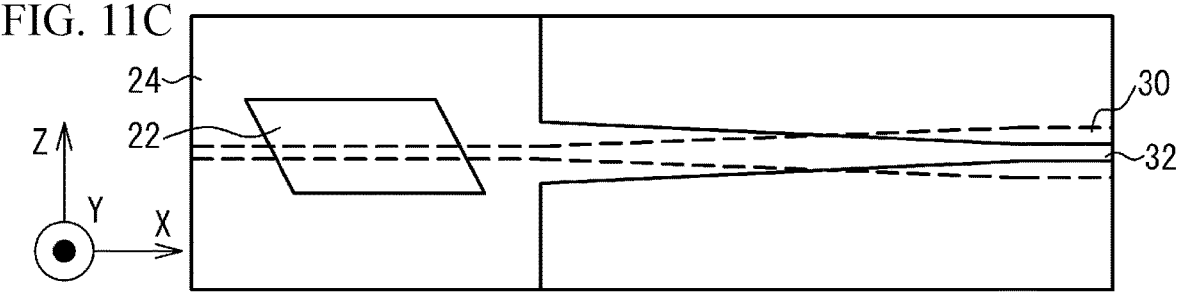
FIG. 11C is a plan view illustrating a method of manufacturing a spot size converter.

As illustrated in FIG. 11C, by dry-etching the lower waveguide 30, the lower waveguide 30 is made tapered from the +X side to the −X side as indicated by a broken line. Specifically, an insulating film covering surfaces of semiconductor layers including the upper waveguide 32, the etching-stop layer 22, and the cladding layers 14, 24 is formed. A resist pattern is formed by photolithography. The resist pattern has a pattern of broken lines illustrated in FIG. 11C. The pattern of the resist pattern is transferred to the insulating film by RIE, then a dry-etching is performed on the semiconductor layers using gases including HI and $SiCl_4$. Thus, a mesa is formed in the lower waveguide 30 as illustrated in FIG. 1A to FIG. 3B. Thereafter, forming an insulating film (not illustrated) to cover the waveguides and dividing the substrate into chips are performed to obtain a device having the spot size converter 100.

According to the first embodiment, the cross-sectional shape of the upper waveguide 32 is a tapered shape that becomes narrower as it moves away from the lower waveguide 30 in the Z-axis direction. The bottom angle θ illustrated in FIG. 3A and FIG. 3B is 60 degrees or less, for example, 54 degrees. Thus, the effective refractive index of the core layer 16 is adjusted, and it is possible to improve the conversion efficiency of light between the core layer 12 and the core layer 16.

The cladding layer 14 provided between the core layer 12 and the core layer 16 has a tapered shape as well as the core layer 16. Since the bottom surface of the cladding layer 14 of the tapered shape is increased compared to a rectangular shape giving the same effective refractive index to the upper waveguide 32, an effective refractive index at the cladding layer 14 is also increased. Thus, the conversion efficiency of light between the core layers is improved. In order to further increase the effective refractive index at the cladding layer 14, the bottom angle θ is set to 60° or less.

By making the cross-sectional shape of the core layer 16 being triangular or trapezoidal, the strength is improved as compared with the case of rectangular, and possibility of breakage can be suppressed. In particular, when the bottom angle θ is 60 degrees or less, the bottom surface is widened and the strength is improved.

The upper waveguide 32 includes the core layer 16 and the cladding layer 26 on the core layer 16. As illustrated in FIG. 1A, and FIG. 2B to FIG. 3A, the cladding layer 26 in the transition region 36 is thinner than that of the connection portion 38. As illustrated FIG. 3B, a portion of the cladding layer 26 is removed. Therefore, the effective refractive index of the cladding layer 26 in the transition region 36 is lower than that of the connection portion 38. Therefore, the conversion efficiency between the core layers is improved. Since it is possible to reduce the effective refractive index by thinning the cladding layer 26, it is not necessary to make the width of the upper waveguide 32 extremely narrow. For example, the width W1 illustrated in FIG. 1B is 1.5 μm, the width W3 illustrated in FIG. 3B is 0.8 μm. Therefore, the strength of the upper waveguide 32 is improved, and damage is suppressed.

As illustrated in FIG. 11C, the lower waveguide 30 has a tapered portion in which a width is reduced from the transition region 36 to the connection portion 38, and the upper waveguide 32 has a tapered portion in which a width is reduced from the connection portion 38 to the transition region 36. Thus, the effective refractive index of the lower waveguide 30 and the upper waveguide 32 is adjusted, thereby the conversion efficiency of the light between the waveguides in the transition region 36 is improved.

For example, as the effective refractive index of the upper waveguide 32 decreases in the transition region 36, the light in the upper waveguide 32 is easily transited to the lower waveguide 30. Further, by the lower waveguide 30 having the tapered portion, the light propagating through the lower waveguide 30 as it approaches the connection portion 38 is cut off.

The end face 31 is an input/output surface of the light, and the light is transited from the lower waveguide 30 to the upper waveguide 32 in the transition region 36. The connection portion 38 is connected, for example, to an optical modulator. Light incident from the end face 31 is transited from the lower waveguide 30 to the upper waveguide 32 with high conversion efficiency, then it can be incident on the optical modulator. Light emitted from the optical modulator can be transited from the upper waveguide 32 to the lower waveguide 30 with high conversion efficiency, and it can be emitted from the end face 31.

As illustrated in FIG. 6B to FIG. 8, since the wet-etching is stopped by the etching-stop layer 22, the mesa having the tapered cross-sectional shape is formed in the cladding layer 24. Furthermore, it is possible to transfer the tapered shape of the cladding layer 24 to the core layer 16 and the cladding layer 14 by the dry-etching.

The mesa of the cladding layer 24 after the wet-etching extends in the <0-11> direction. When the InP layer (cladding layer 24) provided on the InP substrate whose main surface is the (100) plane is wet-etched with a mixed etchant of hydrochloric acid and water (mixture ratio of hydrochloric acid and water:2:3), a (111) plane or its equivalent plane appears in the side surface of the mesa because of etching selectivity depending on a direction of the crystal. An angle of the (111) plane to the (100) plane is about 55°. As an example of obtaining another angle, a wet-etching with a mixture of hydrochloric acid and phosphoric acid (mixture ratio 1:5) causes the mesa to have a (211) plane or an equivalent plane on the side surface. In this example, the angle of the side surface of the mesa is about 35°. By dry-etching the cladding layer 26, the core layer 16, and the cladding layer 14 together with the cladding layer 24, it is possible to taper the cross-sectional shape of the upper waveguide 32, as illustrated in FIG. 9C to FIG. 10C.

Second Embodiment

Figure 12:
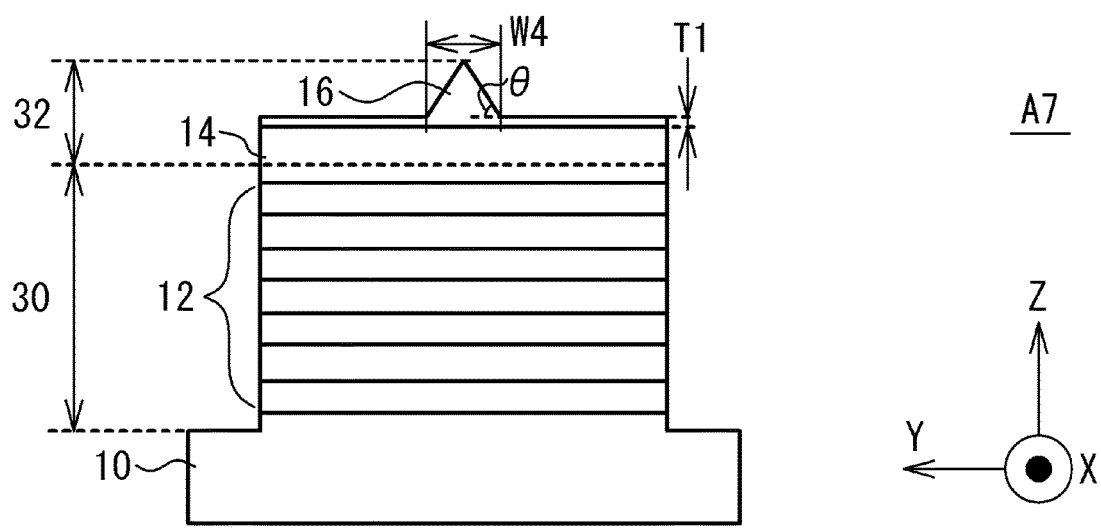
FIG. 12 is a cross-sectional view illustrating a spot size converter according to the second embodiment.

In the second embodiment, the shape of the upper waveguide 32 in the transition region 36 is different from that of the first embodiment. FIG. 12 is a cross-sectional view illustrating a spot size converter according to the second embodiment, and illustrates a cross-sectional view corresponding to the line A7 in FIG. 1A. The cross-sectional shape of the core layer 16 is triangular. The cladding layer 14 is rectangular and covers a surface of the core layer 12. The core layer 16 of thickness T1 remains on a surface of the cladding layer 14. Thickness T1 is, for example, 0.1 μm, and a width of the cladding layer 14 (base of the triangle) W4 is, for example, 0.8 μm. The other constitution is the same as that of the first embodiment. According to the second embodiment, the width of the cladding layer 14 is large, and by the cross-sectional shape of the core layer 16 is triangular. Thus, the effective refractive index of the upper waveguide 32 is increased. It is possible to increase the conversion efficiency.

Although the embodiments of the present invention have been described above in detail, the present invention is not limited to the specific embodiments, and various modifications and variations are possible within the scope of the gist of the present invention described in the claims.

What is claimed is:

1. A spot size converter comprising:
  a first waveguide including a first core layer, the first waveguide propagating light; and
  a second waveguide including a second core layer and provided on the first waveguide, the second waveguide propagating light, wherein
  the first waveguide and the second waveguide extend in a waveguide direction from a first region to a second region, the first region and the second region being provided continuously along the waveguide direction,
  in the first region, the second waveguide has a tapered shape in a cross section which becomes narrower in a direction upwardly away from the first waveguide,
  an angle between a side surface of the second waveguide and a bottom surface of the second waveguide is 60° or less,
  the second waveguide includes a second cladding layer provided on the second core layer, and in the first region, the second cladding layer has no thickness or a thickness thinner than its thickness in the second region.

2. The spot size converter according to claim 1, wherein the second waveguide includes a first cladding layer provided between the first core layer and the second core layer, and
the second core layer and the first cladding layer are included in the tapered shape in the cross section.

3. The spot size converter according to claim 1, wherein the first waveguide has a tapered portion in which a width of the first waveguide decreases from the first region to the second region, and
the second waveguide has a tapered portion in which a width of the second waveguide decreases from the second region to the first region.

4. The spot size converter according to claim 1, wherein the first region has an input/output surface on a side opposite to the second region.

5. A method of manufacturing a spot size converter comprising steps of:
forming a first waveguide having a first core layer and a second waveguide having a second core layer in this order; and
etching the second waveguide to form, in cross section, a tapered shape which becomes narrower in a direction upwardly away from the first waveguide, wherein
an angle between a side surface of the second waveguide and a bottom surface of the second waveguide is 60 degrees or less.

6. The method of manufacturing the spot size converter according to claim 5, wherein
the second waveguide includes a cladding layer provided on the second core layer,
the cladding layer includes an etching-stop layer, and
the step of etching the second waveguide comprises sub-steps of:
wet-etching the cladding layer until the etching-stop layer is exposed for forming a mesa in the cladding layer; and
dry-etching the cladding layer having the mesa and the second core layer.

7. The method of manufacturing the spot size converter according to claim 6, wherein the mesa of the cladding layer extends in a<0-11> direction.

8. A spot size converter comprising:
a first waveguide including a first core layer, the first waveguide propagating light; and
a second waveguide including a second core layer and provided on the first waveguide, the second waveguide propagating light, wherein
the first waveguide and the second waveguide extend in a waveguide direction from a first region to a second region, the first region and the second region being provided continuously along the waveguide direction,
in the first region, the second waveguide has a tapered shape in a cross section which becomes narrower in a direction upwardly away from the first waveguide,
an angle between a side surface of the second waveguide and a bottom surface of the second waveguide is 60° or less,
the first waveguide has a tapered portion in which a width of the first waveguide decreases from the first region to the second region, and
the second waveguide has a tapered portion in which a width of the second waveguide decreases from the second region to the first region.

9. The spot size converter according to claim 8, wherein the second waveguide includes a first cladding layer provided between the first core layer and the second core layer, and
the second core layer and the first cladding layer are included in the tapered shape in the cross section.

10. The spot size converter according to claim 8, wherein the second waveguide includes a second cladding layer provided on the second core layer, and
in the first region, the second cladding layer has no thickness or a thickness thinner than its thickness in the second region.

11. The spot size converter according to claim 8, wherein the first region has an input/output surface on a side opposite to the second region.

* * * * *